Patented Feb. 19, 1952

2,586,385

UNITED STATES PATENT OFFICE 2,586,385

OIL SOLUBLE PHENOLIC RESINS AND VARNISH COMPOSITIONS PREPARED THEREFROM

Robert H. Runk, Pittsburgh, Pa., assignor to Westinghouse Electric Corporation, East Pittsburgh, Pa., a corporation of Pennsylvania No Drawing. Application March 26, 1949, Serial No. 83,784

4 Claims. (Cl. 260—19)

This invention relates to the preparation of oil soluble phenolic resins and varnish compositions prepared therefrom.

It is desirable to have available a heat reactive varnish composition capable of rapid curing in large bodies, so that coils impregnated therewith will cure rapidly even in the most deep-seated portions thereof. Phenolic resins by themselves are too hard and brittle to be employed satisfactorily for such applications and possess certain other shortcomings that have rendered it undesirable to use a straight phenolic resin impregnant.

While it has been proposed to combine a phenolic resin with a drying oil, such compositions have usually turned out to be unsatisfactory in regard to either the physical properties, such as flexibility and aging deterioration, or their chemical characteristics, such as complete and rapid heat-hardening of large bodies and oil resistance. Other disadvantages of previously prepared compositions are skinning of the compositions when exposed to air due to oxygen convertibility. In some instances, the cured compositions previously prepared deteriorated with aging so that when exposed to temperatures and humidity the electrical insulating properties deteriorated rapidly. In some cases it has been found that many phenolic resins are not compatible or soluble in drying oils.

Particularly suitable drying oils for combination with phenolic resins are tung oil, bodied linseed oil and the glyceryl ester of maleic anhydride-linseed oil adduct, called "maleinized linseed oil." These drying oils are characterized by having at least two unsaturated groups in a fatty acid radical.

The object of this invention is to provide an oil soluble phenolic resin compatible with and soluble in drying oils, such that heat reactive varnish compositions can be produced therefrom capable of heat hardening rapidly and having resistance to petroleum oils.

A further object of the invention is to provide for improved varnish compositions comprising an oil soluble phenolic resin and a drying oil.

Other objects of the invention will in part be obvious and will in part appear hereinafter. For a better understanding of the nature and objects of the invention, reference should be had to the following detailed description.

It has been discovered that unexpectedly good oil soluble phenolic resins may be prepared by reacting a mixture of phenols composed of from 80 to 90 mole percent of paratertiarybutyl phenol and from 10 to 20 mole percent of diphenylolpropane, with from 1.5 to 2 moles of an aldehyde per mole of combined phenol, the aldehyde being selected from aqueous formaldehyde and polymers of formaldehyde. The reaction is catalyzed with an alkali metal hydroxide in an amount of from 0.2% to 5% based on the weight of the phenols. Sodium and potassium hydroxide are suitable catalysts. The reaction is effected by heating the reactants with the catalyst at a temperature of between 70° C. and reflux; substantial amounts of water being present in the reaction mixture. The reaction time will vary from three to one hours. The three-hour reaction time is required with the minimum amount of catalyst and the temperature being maintained at 70° C. The reaction may be completed in one hour by heating to reflux and using at least ½% by weight of the catalyst based on the weight of the phenols. The aqueous reaction product at the end of this reaction time is treated with an acid to bring the aqueous phase of the reaction product of a pH of between 4 and 6.5. Examples of suitable acids for this purpose are oxalic acid, phthalic anhydride, hydrochloric acid, sulphuric acid and phosphoric acid. This acidification is extremely critical since without it the reaction product subsequently ensuing is unsuitable for admixing with an oil, while retaining all the desirable properties previously listed. After acidification, the reaction product is agitated for about 15 minutes after which if the acidity remains within the desired range, the aqueous layer is permitted to rise and is decanted. More acid may be added before decanting to bring the pH to a desired value. The resinous layer remaining is subjected to vacuum distillation to an absolute pressure of between 1 and about 50 mm. of Hg, to remove the water present. The resinous residue is heated during the vacuum distillation until a temperature of from 100° C. to 120° C. is reached and then the vacuum is broken and the heating carried out under atmospheric pressure to a temperature of from 110° C. to 140° C. for a period of time sufficient to produce a resinous product that when cooled is hard and brittle and has a softening point of from 75° C. to 105° C. by the ball and ring method.

The following examples are illustrative of the preparation of the phenolic resin.

*Example I*

Into a closed reaction vessel provided with a reflux column, stirrers and the other usual attachments for carrying out a resinous reaction, there was introduced the following:

Parts by weight

| | |
|---|---|
| Paratertiarybutyl phenol (87.5 mole %) | 394 |
| Diphenylolpropane (12.5 mole %) | 86 |
| 37% aqueous formaldehyde | 383 |
| Sodium hydroxide | 1.5 |

The sodium hydroxide constituted approximately 0.3% of the weight of the phenols. The pH of the mixture at the start of reflux was 8.5. The reaction vessel was heated until refluxing started at atmospheric pressure, and heating under reflux was continued for 1½ hours. The resulting condensation product was cooled to 80° C. and then treated with 10% aqueous sulphuric acid to reduce the pH. Five separate samples of the condensation product was prepared by varying the amount of added sulphuric acid, and the samples were as follows:

*Samples*

| | pH |
|---|---|
| A | 8 |
| B | 6.4 |
| C | 5.5 |
| D | 5.0 |
| E | 4.6 |

Each of the samples were separately treated in an identical manner by agitating with the acid for 15 minutes. Then each of the samples of the resinous compositions was permitted to stand to cause a separation of the resinous layer from the aqueous layer, after which the aqueous layer was removed and the resinous layer was subjected to vacuum distillation to remove the water present. The vacuum distillation was continued until a temperature of 110° C. for the mass was reached at a pressure of 20 mm. of mercury. Thereafter, the vacuum was broken and the further polymerization of the resin was carried out under atmospheric pressure at a temperature of between 120° and 130° C. The heating was continued until a cooled sample formed a hard brittle resin having a softening point of between 80° C. to 90° C. by the ball and ring method.

Each of the five samples resulting from the reaction was crushed to a powder and admixed with an equal part of a number of drying oils and tested for compatibility and oil solubility. Sample A was incompatible with tung oil, linseed oil bodied to a viscosity of Y on the Gardner-Holdt scale, and the maleinized linseed oil previously mentioned. Samples B to E, however, were compatible with the tung oil and the maleinized linseed oil.

*Example II*

Into a reaction vessel as under Example I, there was introduced the following mixture:

Parts by weight

| | |
|---|---|
| Paratertiarybutyl phenol | 366 |
| Diphenylolpropane | 128 |
| 37% aqueous formaldehyde | 364 |
| Sodium hydroxide | 1.5 |

The mole proportions of the paratertiarybutyl phenol to diphenylpropane was 81¼% to 18¾%. The reaction was carried out as under Example I, the pH being adjusted with sulfuric acid to a value of 5.5 just before the water decantation and vacuum distillation steps. The hard brittle resin finally produced was found to be fully compatible with tung oil and maleinized linseed oil.

Heat reactive varnish compositions were prepared from the compositions B to D under Example I and the composition of Example II. The compositions comprised between 75 and 150 parts by weight of a drying oil and 100 parts of the powdered phenolic resin. After admixture, the drying oil and the powdered phenolic resin were heat bodied at temperature from 130° C. to 160° C., the bodying time varying from 12 minutes to 30 minutes at 150° C., sufficient to produce a two-inch string of resin when a rod was dipped in the hot composition. The heat bodied composition was then dissolved in mineral spirits producing varnish compositions containing approximately 50% resin solids. The compositions in each case could be diluted to any extent since they possessed an infinite tolerance to the mineral spirits. The bodied varnish compositions so resulting had a gel time at 135° C. of between three-quarters of an hour and one and one-half hours. After baking for six hours at 135° C., cakes of the varnish composition had a hardness, as determined by the Shore "A" durometer, of from 30 to 45. The varnishes resisted the action of transformer oil at 110° C.

Electrical coils were prepared by applying thereto the varnish compositions of this invention and the coils were baked at 135° C. for three hours. The coils were then cut apart and the varnish was found to be completely cured in the deepest portions of the coil. The coils could be employed in contact with hot transformer oil without substantial deterioration. Coatings of the varnish will cure in less than one hour at 135° C. Tests of flexibility and aging showed that the compositions for this invention produce flexible cured varnish films that would retain their flexibility for prolonged periods of time under the most severe conditions of temperature to be expected in electrical service in a manner comparable to the best oil base varnishes available. When tested for electrical insulation properties under conditions of high humidity, the compositions were found to be superior to many other varnish compositions now sold and used extensively in the trade. The compositions passed all of the standard tests applied for the determination of satisfactory varnish films and in many cases were found to be superior to any varnish known or sold in the trade at the present time for this type of service. The compositions also were relatively free from skinning when exposed to the atmosphere.

The proportions of from 10 mole percent to 20 mole percent of diphenylolpropane in the mixture of phenols with the balance being paratertiarybutyl phenol in combination with acidification of the formaldehyde reaction product prior to removal of water to a pH of between 4 and 6.5 is critical. I have prepared numerous reaction products of paratertiarybutyl phenol alone and formaldehyde in the same manner as in Example I, acidifying before removal of water to a pH of 8.6, 7.6 and 4.2 for example, and found none of the resulting resins suitable for preparing a satisfactory varnish in combination with a drying oil. Thus the reaction products having a pH of 8.6 and 7.6 were incompatible with the oils. Those phenolic resins with a pH on the acid side, while oil compatible, lacked oil resistance and heat-reactivity. Other resins were prepared with a higher proportion of diphenylolpropane than the critical upper limit of 20% and were found to lack oil compatibility. For example, the reaction products of 25 mole percent of diphenylolpropane and 75 mole percent of paratertiarybutyl phenol and formaldehyde reacted in many ways and acidified over the pH of 4 to 8.5, in all cases were incompatible with drying oils.

The maleinized linseed oil may be prepared by reacting 100 parts by weight of linseed oil with from 3 to 8 parts by weight of maleic anhydride at a temperature of up from 240° C. to 270° C. for not more than four hours until an adduct is produced. Then a polyhydric alcohol is added in an amount to provide from one to 1.1 hydroxyl groups per maleic anhydride radical present in the adduct. The polyhydric alcohol should have no other reactive groups than the hydroxyl groups. Suitable examples are glycerol, ethylene glycol, diethylene glycol, pentaerythritol and 1.3 propylene glycol. The mixture with the added polyhydric alcohol is heated at temperatures of from 200° C. to 270° C. for a few hours to esterify the carboxyl groups of the linseed-maleate adduct. An acid number of from 5 to 12 and a viscosity of from W to Y on the Gardner scale is suitable for the glycerol based maleinized linseed oil.

It is intended that all the matter contained in the above description be considered as illustrative and not limiting.

I claim as my invention:

1. A partially reacted, thermosettable, powdered phenolic resin derived by reacting one mole of a mixture of from 90 to 80 mole percent of paratertiarybutyl phenol and from 10 to 20 mole percent of diphenylolpropane with from 1.5 to 2 moles of an aldehyde selected from aqueous formaldehyde and polyymers of formaldehyde at temperatures of between 70° C. and reflux, in the presence of from 0.2% to 5% based on the weight of the phenols, of an alkali metal hydroxide catalyst, the reaction time varying from 3 hours with the minimum amount of catalyst and the lowest temperatures to 1 hour using reflux and more than ½% by weight of catalyst, the aqueous reaction product then being neutralized and rendered acidic with an acid to a pH of between 4 and 6.5, removing the water from the acidified reaction product by evacuation, and heating the resinous residue until a resinous product having a ball and ring softening point of between 75° C. and 105° C. is attained.

2. A heat reactive varnish composition comprising as its essential ingredients from 75 to 150 parts by weight of a glyceride of an unsaturated acid having at least two ethylenically unsaturated groups, and 100 parts by weight of a partially reacted, thermosettable, phenolic resin derived by reacting one mole of a mixture of from 90 to 80 mole percent of paratertiarybutyl phenol and from 10 to 20 mole percent of diphenylolpropane with from 1.5 to 2 moles of an aldehyde selected from aqueous formaldehyde and polymers of formaldehyde at temperatures of between 70° C. and reflux, in the presence of from 0.2% to 5% based on the weight of the phenols, of an alkali metal hydroxide catalyst, the reaction time varying from 3 hours with the minimum amount of catalyst and the lowest temperatures to 1 hour using reflux and more than ½% by weight of catalyst, the aqueous reaction product then being neutralized and rendered acidic with an acid to a pH of between 4 and 6.5, removing the water from the acidified reaction product by evacuation, and heating the resinous residue until a resinous product having a ball and ring softening point of between 75° C. and 105° C. is attained, the glyceride and the phenolic resin having been heat bodied to provide a relatively homogeneous composition.

3. The composition of claim 2 wherein the glyceride is tung oil.

4. The composition of claim 2 wherein the glyceride is the reaction product of 100 parts of linseed oil and from 3 to 8 parts of maleic anhydride at a temperature of from 240° C. to 270° C. for not more than 4 hours until an adduct is produced, after which a polyhydric alcohol is admixed in an amount to furnish from one to two hydroxyl groups for each maleic anhydride molecule present in the adduct, the polyhydric alcohol having no other reactive groups than the hydroxyl groups, and an esterifying reaction between the polyhydric alcohol and the maleic anhydride radicals in the adduct is effected by heating the mixture at a temperature of up to 270° C. for at least one hour.

ROBERT H. RUNK.

REFERENCES CITED

The following references are of record in the file of this patent:

UNITED STATES PATENTS

| Number | Name | Date |
|---|---|---|
| 2,174,819 | Butler | Oct. 3, 1939 |
| 2,345,357 | Powers | Mar. 28, 1944 |
| 2,389,078 | Powers | Nov. 12, 1945 |